United States Patent
Park

(10) Patent No.: US 8,773,515 B2
(45) Date of Patent: Jul. 8, 2014

(54) CONTROL METHOD AND APPARATUS FOR DISPLAYING MOVING PICTURES

(76) Inventor: Seung-min Park, Seoul (KR)

(*) Notice: Subject to any disclaimer, the term of this patent is extended or adjusted under 35 U.S.C. 154(b) by 366 days.

(21) Appl. No.: 13/135,542

(22) Filed: Jul. 8, 2011

(65) Prior Publication Data

US 2013/0010088 A1 Jan. 10, 2013

(51) Int. Cl.
*H04N 13/04* (2006.01)
(52) U.S. Cl.
USPC ............................................................ 348/51
(58) Field of Classification Search
None
See application file for complete search history.

(56) References Cited

U.S. PATENT DOCUMENTS

| | | | |
|---|---|---|---|
| 2002/0003575 A1* | 1/2002 | Marchese | 348/231 |
| 2010/0254463 A1* | 10/2010 | Narroschke et al. | 375/240.29 |
| 2011/0069763 A1* | 3/2011 | Shin et al. | 375/240.17 |
| 2011/0102558 A1* | 5/2011 | Moliton et al. | 348/54 |

FOREIGN PATENT DOCUMENTS

| | | |
|---|---|---|
| KR | 10-2009-0014753 A | 2/2009 |
| KR | 10-2009-0056647 A | 6/2009 |

* cited by examiner

*Primary Examiner* — Sath V Perungavoor
*Assistant Examiner* — Kate Luo
(74) *Attorney, Agent, or Firm* — Flynn, Thiel, Boutell & Tanis, P.C.

(57) ABSTRACT

A control method and apparatus for displaying moving pictures are disclosed, which make it possible to significantly reduce a side effect occurring when watching a 3D moving picture, in particular, a side effect such headache, nausea or dizziness generally occurring when a watcher watches a 3D moving picture while a watcher watches an excellent 3D moving picture. The method for displaying moving pictures comprises a step for receiving a data source containing a moving picture, a variable filtering information of the moving picture which is in time-sync with the moving picture and controls the fatigue that a user feels in the course of watching moving pictures, and a filter mask image code; a step for filtering the moving pictures with respect to the section in which the filtering is set depending on the variable filtering information and the filter mask image; and a step for outputting the filtered moving pictures.

8 Claims, 11 Drawing Sheets

CONTROL METHOD AND APPARATUS FOR DISPLAYING MOVING PICTURES

TECHNICAL FIELD

The present invention relates to a control method and apparatus for displaying moving pictures which make it possible to significantly prevent watcher's eye fatigues and some side effects occurring when a watcher watches three dimensional (3D) pictures, and in particular to a control method and apparatus for displaying moving pictures which significantly reduce a watcher's eye fatigue with the aid of a variable filter time-synchronized to 3D moving pictures.

BACKGROUND ART

In recent years, a 3D movie becomes a big trend in movie and broadcast fields.

Diverse method and factors are applied to help a watcher feel better 3D effects, among which a method of using a viewing time difference between two eyes is most important. A stereoscopic 3D technology and a multi-view 3D technology are developed with the aid of a technique of using a viewing time difference between two eyes.

The stereoscopic 3D technology is mainly applied to the current 3D moving pictures, which technology consists of a glasses method and a non-glasses method depending on whether or not a user wears glasses. The glasses-based method consists of a method of using a polarized glasses and a method of using a shuttered glasses. The non-glasses based method consists of a lenticular method of using a film which has a lot of perpendicular, intense wrinkles and a Parallax Barrie method of using a perpendicular shut-off line.

The procedures that a watcher feels 3D pictures will be described with reference to FIG. 1.

A creature including human being can recognize an object with spaced-apart two eyes as one object even though there is a retinal image disparity which occurs since two eyes spaced-apart about a nose watch the thing with a time difference, because different retinal corresponding points at the retinas of two eyes are recognized by a brain as one object. When a watcher watches one object O, the image of the object O is formed at a macula F which corresponds to the retina corresponding points of two eyes. However, the watcher recognizes the macula F recognized by each eye, as an imaginary viewing axis F", which is called a common visual direction corresponding to a common viewing axis. The point A is far away from the object O, but it is positioned at the common visual direction F". When viewing the object O, the point A is formed at the point "a", which is a corresponding point of the retina, closer to the nose as compared to the point F, so the watcher recognizes that the point "a" is positioned at the father back portion than the object O. On the contrary, since the point B is closer than the object O, the image is formed at the point "b", which is a corresponding point of the retina, closer to the nose than the point F, so the watcher recognizes that the point "b" is at the more forward side than the object O. When the image is formed at both the corresponding retinal points of two eyes, the watcher recognizes as one thing like a single vision and has the common viewing axis.

What a thing is recognized in 3D along with a depth is called a stereopsis. In the stereopsis, there are an image watched by the left eye and an image watched by the right eye, and both the images are integrated and recognized as one image. The procedure that the retinal images from both the eyes are integrated as one image via a certain neural procedure is called a sensory fusion. For a reliable fusion, the image watched by the left eye and the image watched by the right eye should be at least similar with each other. If very different images are formed at both the eyes, there might be a problem such as diplopia, superimposition, and retinal rivalry in which two images are alternately seen or a suppression in which only one image is formed, which results in a visual fatigue in a brain.

According to a research, when the conventional 2D moving picture is converted into a 3D moving picture, the amount of the data to be processed by the brain of the human being is increased by at least 4 times or 7 times which exceeds the summed numbers of the left images and the right images. In this case, the quality of the image is much better. When the huge amount of the moving pictures is converted, the watchers might feel a lot of eye fatigue due to the over load of sensory fusion such as dizziness, nausea, and headache.

In worse case, when watchers watch the poorly manufactured 3D moving pictures or watch a 3D moving picture having a lot of motions and a complicated scene, the watchers might feel headache, nausea or dizziness, not feeling a reliable 3D moving picture.

The aftereffects after watchers watch a 3D moving picture might be very different depending on individuals. For example, a person used to a more complicated 3D moving picture might have less aftereffects or small aftereffects, but a person not used to the same, he might have huge aftereffects.

The above aftereffects do not always occur when watching a 3D moving picture. Namely, such aftereffects might occur when watching a 2D image. When a watcher watches a moving picture recorded in a hand-held technique, the watcher might feel dizziness or headache.

The moving speed of a character in a 3D contents and a motion of a recording camera might not change, but the complexity of an image that a watcher can subjectively recognize, is controllable.

DISCLOSURE OF THE INVENTION

Accordingly, it is an object of the present invention to provide a control method and apparatus for displaying moving pictures which make it possible to significantly reduce a side effect occurring when watching a 3D moving picture, in particular, a side effect such headache, nausea or dizziness generally occurring when a watcher watches a 3D moving picture while a watcher watches an excellent 3D moving picture.

To achieve the above object, there is provided a control method and apparatus for displaying moving pictures by which it is possible to control a complexity of a 3D moving picture to an extent that a watcher does not feel any eye fatigue, and a user of an apparatus can determine whether or not a complexity of a 3D moving picture is used.

Advantageous Effects

The control method and apparatus for displaying moving pictures according to the present invention can reduce physical and mental side effects such as headache, nausea or dizziness occurring when a watcher watches a moving picture with a lot of motions or a complicated moving picture while allowing a watcher to watch an original picture before conversion into a moving picture.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE INVENTION

The preferred embodiments of the present invention will be descried with reference to the accompanying drawings.

Figure 1:
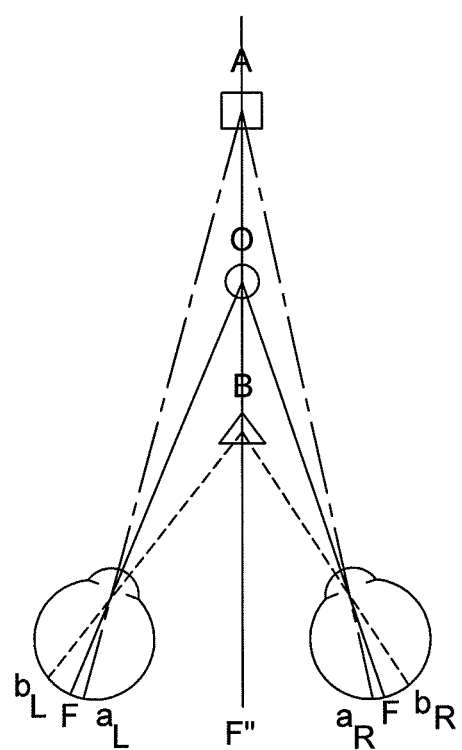
FIG. 1 is a view illustrating a procedure that a watcher recognizes a 3D image.
Figure 2:
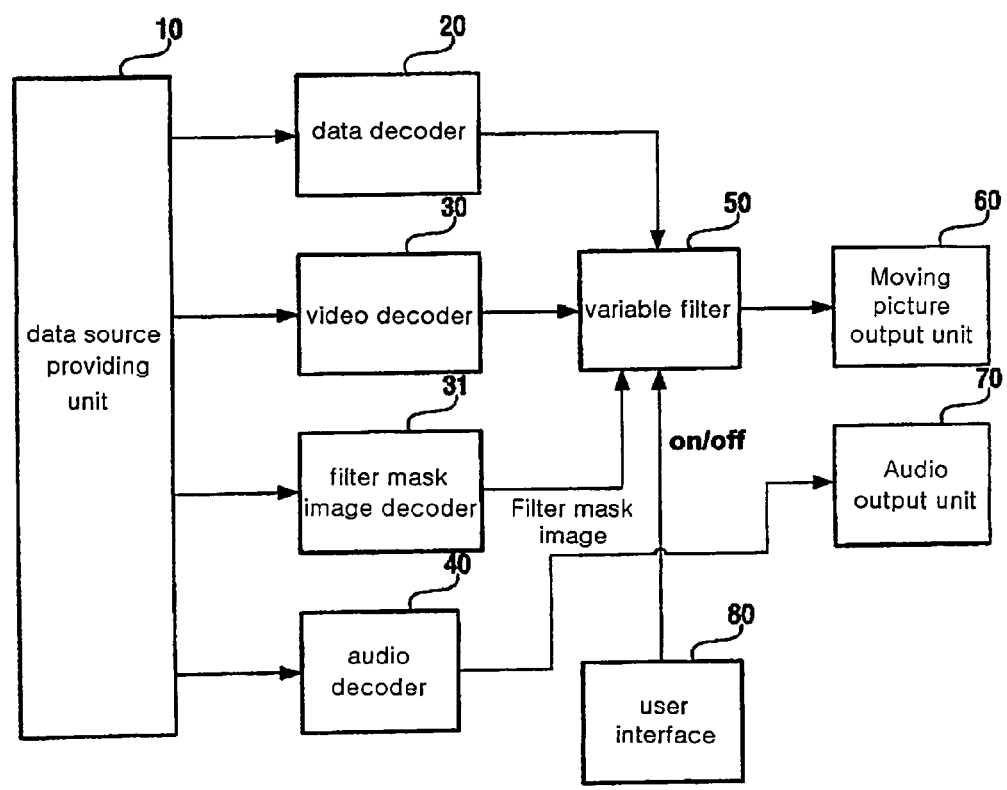
FIG. 2 is a view illustrating a construction of a control apparatus for displaying moving pictures according to an embodiment of the present invention.

FIG. 2 is a view illustrating a control apparatus for displaying moving pictures according to an embodiment of the present invention.

A data source providing unit 10 provides a moving picture, a filter mask image, an audio and other data. For example, in case of a ground wave digital broadcast, the data source providing unit 10 comprises a RF receiver formed of an antenna, a tuner, etc. and an inverse multiplexer for separating a moving picture, an audio and other data from the digital data from the RF receiver. In case of a satellite digital broadcast, the data source providing unit 10 comprises a front end for receiving a satellite broadcast, and an inverse multiplexer for separating a moving picture, an audio and other data from the digital data from the front end. The filter mask image is compressed based on a non-loss compression (for example, a LZW method, a Hoffman code method, a ZIP method) so that a variable filter, which will be described later, combine the images with a moving picture outputted from a video decoder. In case of using a medium capable of storing moving pictures like a Blue ray disk, the data source providing unit 10 comprises a disk reader for reading an information stored in the disk and reading out a digital data, and an inverse multiplexer for separating a moving picture, an audio and other data from the digital data. The storing medium having a previously stored data source might be at present one of a DVD, a Blue ray disk, a hard disk and a SSD and might uses a certain storing medium which will be developed soon.

The data source providing unit 10 might be designed to receive one type of data, and might be designed to receive diverse types of data.

The video decoder 30 decodes an encoded moving picture for its recovery, and for example, the video decoder 30 decodes a moving picture encoded in H.264 type based on a H.264 decoding method for thereby recovering an original moving picture.

The filter mask image decoder 31 decodes a filter mask image compressed based on a non-loss method with respect to a data source and supplies the filter mask image to a variable filter 50.

The audio decoder 40 decodes an encoded audio signal for its recovery. In case of an audio signal encoded in an AC-3 type, the audio decoder 40 decodes the signal based on an AC-3 decoding method for thereby recovering an original audio signal.

The data decoder 20 serves to decode other data such as a text data, an EPG data, etc. except for an audio and moving picture data. The data decoder 20 serves to extract a variable filter information included in other data and provides to the variable filter 50.

The variable filter information is an information time-synchronized with the moving picture and has a time code information common with the moving picture. The time code information might be a standard stipulated by SMPTE (Society of Motion Picture and Television Engineers). The variable filter information might be an authoring information manufactured by a moving picture manufacturer in the course of a post production with respect to the moving picture or might be an information separately manufactured in order to control a watching eye fatigue by a third party person, not a moving picture manufacturer. In case of the former, a moving picture and a variable filter information are together stored in a medium (for example, a Blue ray disk) containing moving pictures, but in case of the latter, the variable filter information is not stored in a medium containing moving pictures. Namely, a user of an apparatus can obtain a variable filter information by alternative method such as a downloading on internet.

The variable filter 50 filters the moving pictures decoded by the video decoder 30 while adjusting resolutions, depending on a variable filter information from the data decoder 20 and a filter mask image provided from the filter mask image decoder.

As the screen size increases, a viewing angle becomes wider. Since the focuses of eyes are needed to move without stops in order to observe objects on the screen, eye fatigue takes place faster.

In order to overcome the above problems, the present invention is basically directed to a method of partially adjusting the resolution of a screen, not reducing the resolutions of the whole screen in order to minimize the motions of eye focuses.

Namely, the object of the screen to be considered at a key element in the 3D image is processed by a 3D method, and the unnecessary region is processed by a 2D method, thus artificially matching the focuses of eyes with a 3D objet at the time. With the above method, it is possible to maximize the effects of the 3D image on the screen on which a lot of images change, thus minimizing the fatigues of eyes.

Figure 3:
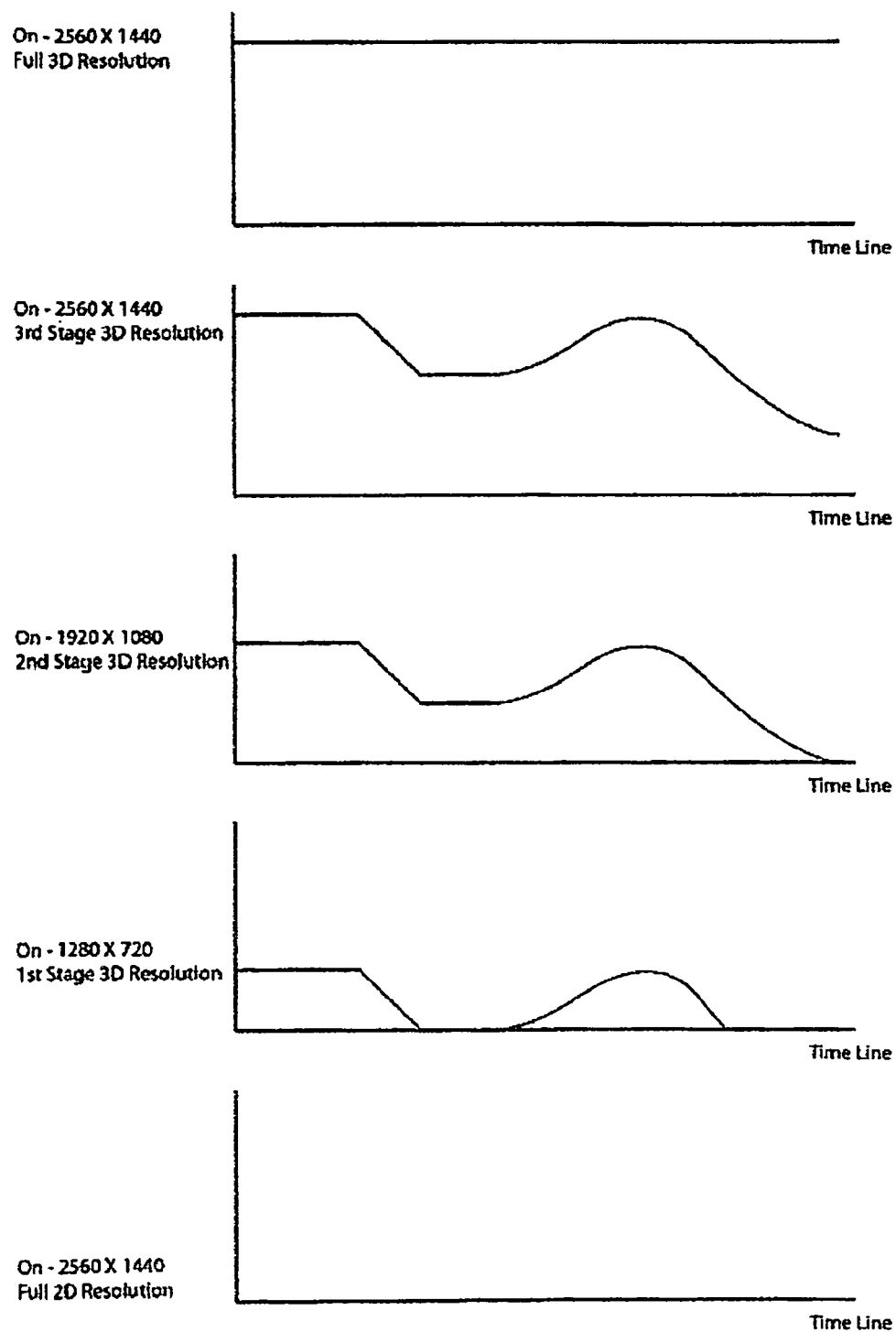
FIG. 3 is a graph of a variable resolution filtered by steps.

FIG. 3 is a graph of a variable resolution of a moving picture which is filtered step by step.

FIG. 3 shows an extent that a person can recognize a moving picture including 3D moving pictures having the highest level when comparing to the 2D moving picture. When a person watches a 3D moving picture having the highest level of resolution, the fatigue of a person increases.

Figure 4:
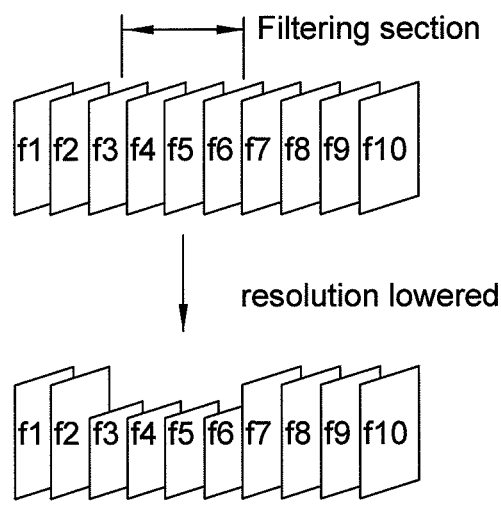
FIG. 4 is a view illustrating a frame when resolution is reduced.

FIG. 4 is a view of a filtering method in a way of reducing a frame resolution according to the present invention.

Figure 5A:
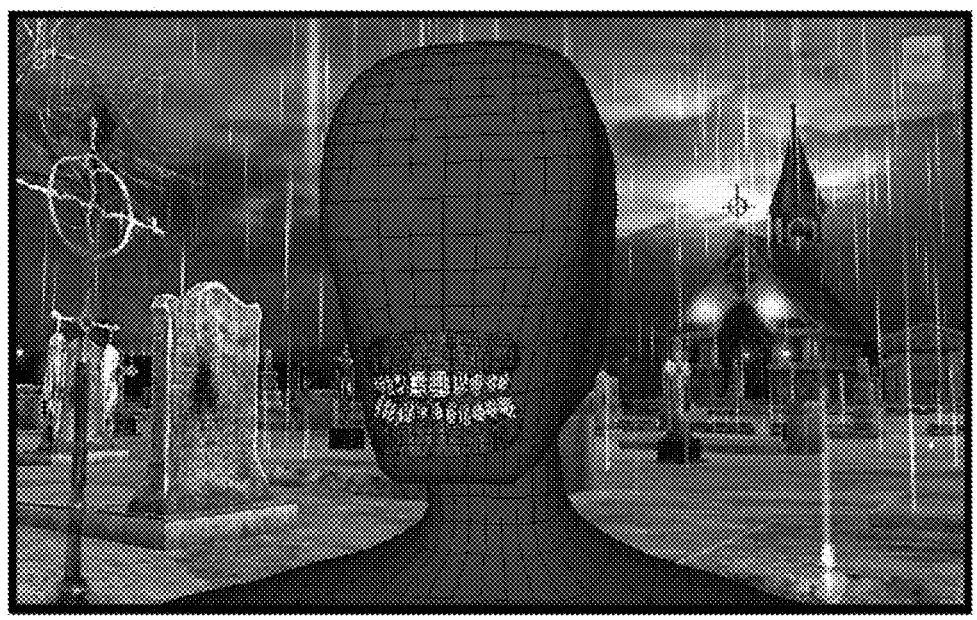
FIGS. 5A, 5B and 5C are views of a variable region based resolution adjusting method.
Figure 5B:
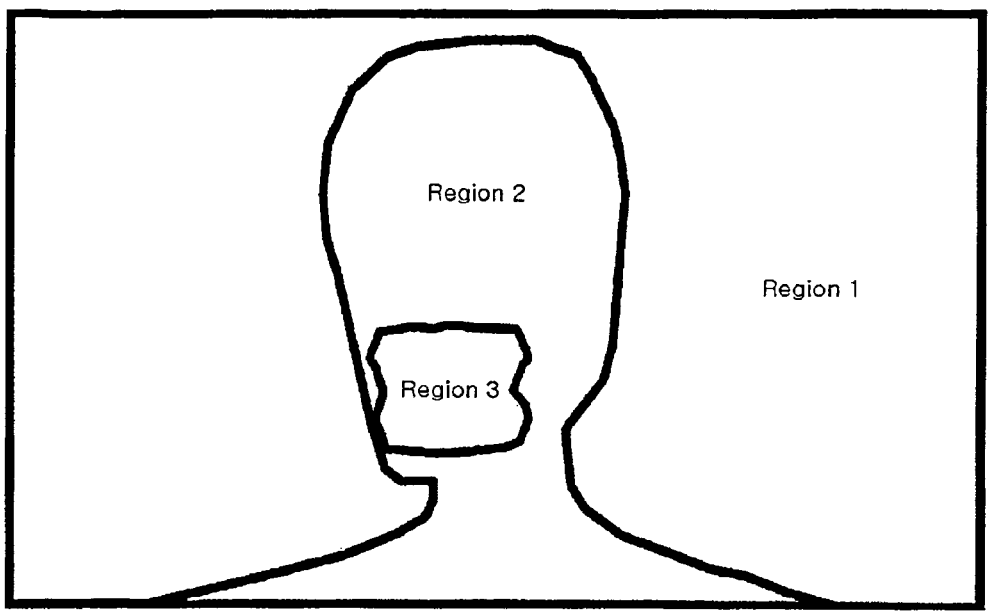
Figure 5C:
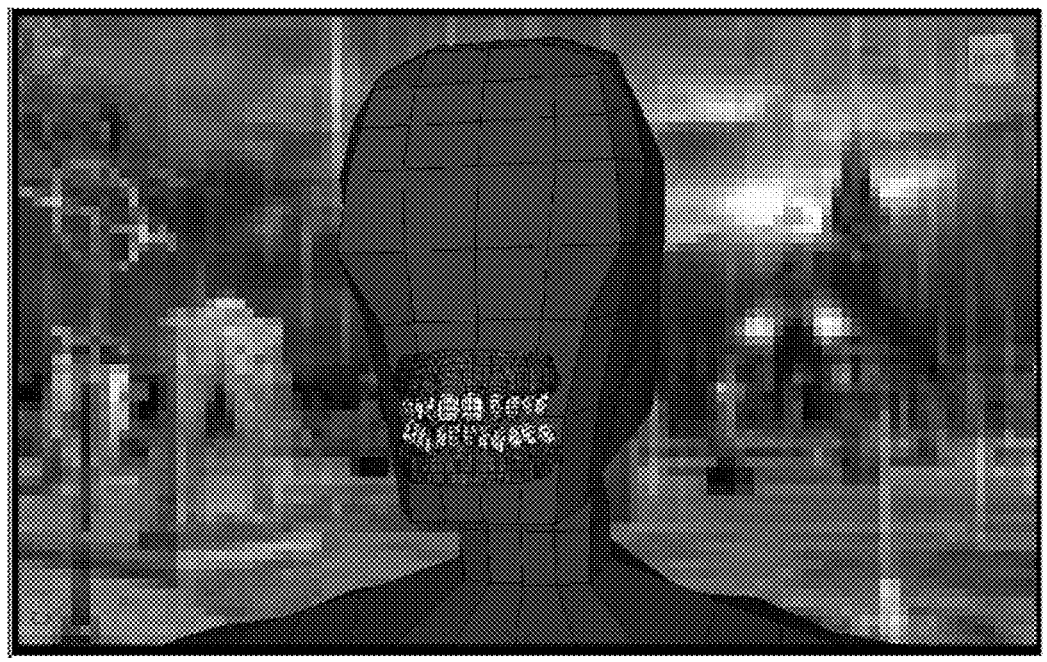

FIGS. 5A, 5B and 5C are views illustrating a filtering method of adjusting resolutions by selecting part of an image and varying the selected part by the regions.

As a display technology advances, the number of pixels to be processed on the screen sharply increases, and the number of color to be expressed increases. However, it seems that a brain does not process a huge amount of images and fast images corresponding to the sizes of the pixels of the screen, which results in causing dizziness. In order to minimize the dizziness, it is preferred that the amount of information to be processed by a brain is reduced. There are diverse methods for reducing the amount of information to be processed. Since the resolutions of the screen are fixed, it is needed to perform a certain operation which is generally used when reducing the resolutions. A method for decreasing the resolution to an extent that a high resolution image can be obtained without casing image degradation is generally used. In a common remote distance stop screen, a high resolution is needed. In case of a screen in which moving pictures dynamically change fast, it is needed to reduce the amount of information which is visually inputted. What resolution varies represents that a blur process, a frame number decreasing process or a color number decreasing process are performed in order to minimize the amount of visual information. Since images correspond to a 3D image, the image feels better than 2D images. The image of the filter mask of FIG. 5B is needed to be compressed based on a non-loss compression method with a code for a region-based resolution conversion with respect to the moving pictures of the original resolution of FIG. 5A. The compressed data are decompressed by the filter mask image decoder 31, and the decompressed data are provided to the variable filter. The variable region-based resolutions are converted by the variable filter 50 depending on the filter mask image provided from the filter mask image decoder 31 and the variable filtering information provided from the data decoder 20, so the resolutions change by the regions like in FIG. 5C.

The frame section to be filtered can be selected by selecting a sensitive section while a user previously links the flows of images in the whole moving pictures. Part of the frames of the moving pictures is filtered in the above method, so it is possible to reduce the eye fatigue in the course of the recognition of the 3D moving pictures.

Figure 6:
FIG. 6 is a view illustrating a variable region based resolution adjustment in an authoring tool.

FIG. 6 is a view illustrating a procedure that the variable region-based resolution adjustments of FIGS. 5A, 5B and 5C are performed by an authoring tool. In order to express the variable regions and the variable resolutions, a parameter corresponding to a 3D manufacture procedure and a corresponding data are inserted in a non-linear type or are inserted in the course of authoring procedure. An editor who finally edits the images or an authoring engineer can input a certain data value for completion.

A corresponding parameter and its data can be provided in a plug-in type or in the form of a separate parameter track in an authoring tool or an editing tool.

The amounts of a variable region and a variable resolution to be applied depending on the level (for example, level 10) are designated to the manufactured 3D image. The thusly inputted data is a small amount of a hundreds KB for one hour running images, so no operation loads occur during the operation of actual images. Corresponding information might be added to an empty text track in the course of authoring of DVD or Blue ray, and the information is compatible with most of currently commercial formats.

The variable regions and recorded in the course of the authoring procedure and the variable resolution parameter and the data are decoded again by the 3D image display apparatus and are adapted to the screen. A separate decoding apparatus might be mounted in a television set or might be mounted in a set top box, a receiver, a tuner or something. In this case, an Aux track of a digital cable is used, so an additional apparatus is not needed.

When watching the 3D moving pictures filtered based on the variable filter information, a watcher can feel less fatigue. The watcher might want to watch an original 3D moving picture which is not filtered. When the watcher wants to watch an original 3D moving picture, it is possible to determine the use of a variable filter via a user interface 80.

When a use command of a variable filter is inputted from the user interface 80, the variable filter 50 performs a filtering operation with respect to a 3D moving picture, and when a non-use command is inputted, the filtering oration with respect to the 3D moving picture is not performed.

The user of the apparatus of the present invention can adjust the level of the filtering performed by a variable filter.

The use command of the variable filter might include a command for adjusting the level of filtering. The variable filter 50 serves to lower the level of filtering or to enforce the same which is obtained from the variable filter information.

The variable filter information is provided from the data decoder 20, and the image outputted from the video decoder 30 is filtered by the variable filter 50 along with the filter mask image provided from the filter mask image decoder 31 and are outputted to the 3D picturing output unit 60. The audio output unit 70 serves to output audio.

When watching a 3D moving picture filtered depending on the variable filter information, the watcher feels less fatigue. Similar with the earlier embodiment of the present invention, there might be an occasion that the watcher wants to watch an original moving picture which is not filtered. When watching an original moving picture, it is possible to determine, via the user interface 80, whether or not a variable filter is used.

When a use command of a variable filter is inputted from the user interface 80, the variable filter 50 performs a filtering operation with respect to the moving pictures, and when a non-use command is inputted, the filtering operation with respect to the moving pictures is not performed.

Figure 7:
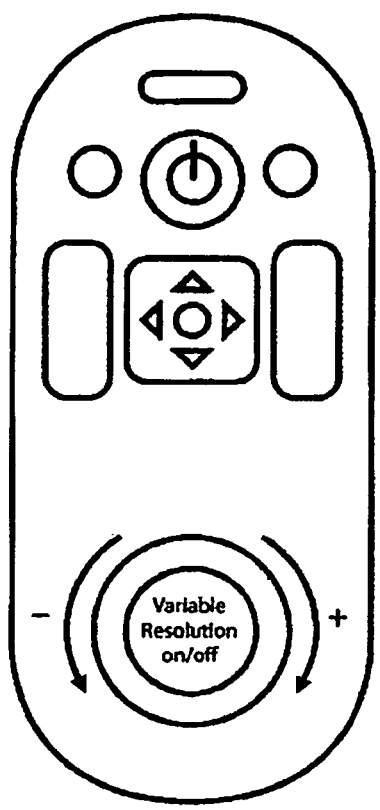
FIG. 7 is a view illustrating a remote controller operating in sync with an apparatus of the present invention.

FIG. 7 is a view illustrating a remote controller operating in sync with an apparatus of the present invention. For example, when a variable resolution on/off switch of the remote controller is turned on, the filtering operation is performed step by step, and at the same time the resolution of the region-based or whole screen is adjusted. The variable resolution can be adjusted step by step by using a switch such as a jog shuttle. When the resolution is adjusted to the highest level by using "+" switch, it is possible to watch the 3D moving pictures at the highest resolution. When the resolution is lowered by using the "−" switch, it is possible to watch the 2D images at the lowest resolution. Between the highest level and the lowest level, the 3D moving picture filtered to the variable resolution in match with the variable region (or whole screen) complexity of the authored display screen can be seen. The display apparatus such as a television set or something operating along with a remote controller can comprise a variable resolution on/off switch, and a level up/down switch.

The construction of the display apparatus formed of a far infrared ray receiver or something operating in sync with a remote controller is known, so the descriptions thereof will be omitted.

The operation that the variable filter information of FIG. 2 is outputted from the data decoder 20 is provided for illustrative purpose. The variable filter information might be obtained from the moving picture from the video decoder 30. For example, when variable filter information is contained by a water mark technique in each frame of the moving picture, the variable filter information might be extracted and be provided to the variable filter.

Figure 8:
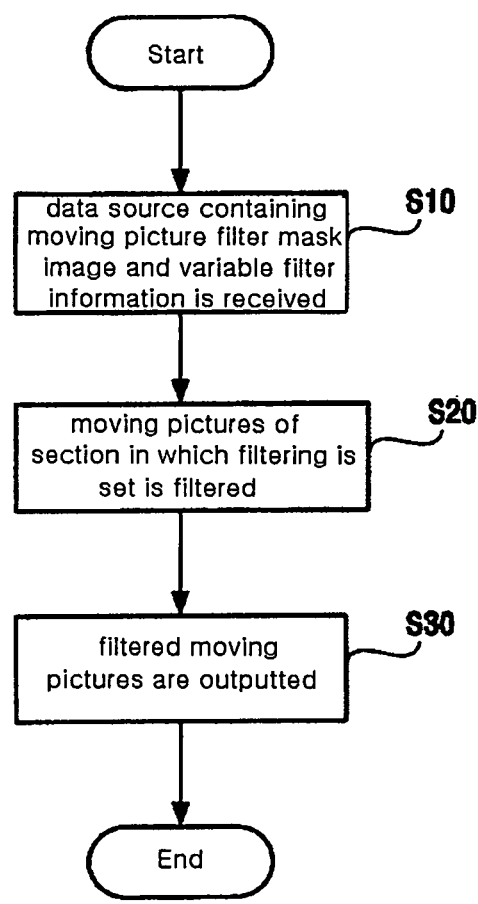
FIGS. 8 and 9 are flow charts for explaining the control method for displaying moving pictures according to the present invention.

FIG. 8 is a flow chart of a display procedure according to an embodiment of the present invention.

The display apparatus receives a data source containing a moving picture, a filter mask image and a variable filtering information in Step S10. Here, the moving picture, the filter mask image and the variable filtering information might be received from a broadcast medium or a certain storing medium or might be received via a wired or wireless communication method. The moving picture might be received from a storing medium, and the variable filtering information might be received via the communication medium. The moving picture to be received might be compressed by a loss method or a non-loss method or might be not compressed.

After receiving a data source containing a moving picture, a filter mask image and a variable filtering information, the display apparatus filters the moving pictures of the section set by the filter in Step S20. It might be part of the moving picture of the filtering section or the whole sections. The moving picture might be sectioned into multiple filtering sections, and the type of filtering might be different in each section. The formats of the filtering might be divided depending on the filtering type or the level of filtering. The level of the filtering serves to determine the level of the filtering with respect to the set filtering method. For example, reducing the resolution to 90% or 80% is determined depending on the level of the filtering.

The display apparatus outputs a filtered moving picture in Step S30.

The filtering method unconditionally performed depending on the variable filtering information might be applied to a display apparatus that multiple people watch together in a movie theater or might be applied to a home television set.

Figure 9:
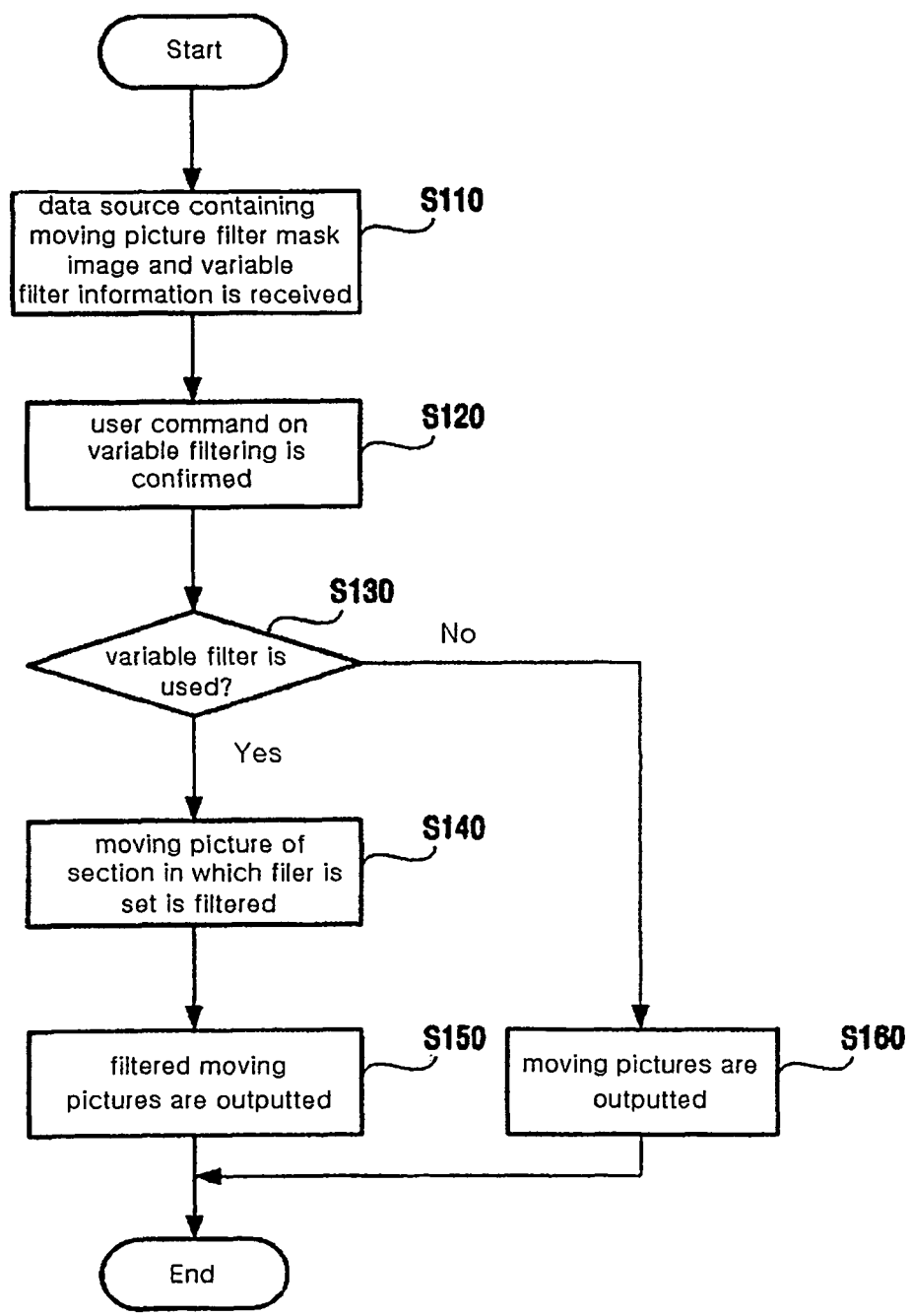

FIG. 9 is a flow chart of a display procedure according to another embodiment of the present invention.

The display apparatus receives a data source containing a moving picture, a filter mask image and a variable filtering information in Step S110. The display apparatus confirms whether or not a user command with respect to a variable filter is inputted from the user interface while the moving pictures are being displayed in Step S120. It is checked whether or not the current state corresponds to a state that the variable filter is used in Step S130.

When the user command corresponds to the use of the variable filter, the display apparatus filters the moving pictures of the section in which the filtering is set in Step S140, and the filtered moving pictures are outputted in S150. The use command of the variable filter might contain a command for readjusting the level of the filter.

When the user command corresponds to a non-use of the variable filter, the display apparatus outputs a moving picture without filtering in Step S160.

There are moving pictures which are divided into first, second and third sections depending on the variable filtering information. Assuming that the first section outputs 100% of resolution, and the second section outputs 90% of resolution, and the third section outputs 100% of resolution, when the user command corresponds to the non-use of the varying filter, the first to third sections all 100% of resolution. When the user command corresponds to the use of the variable filter, the first section outputs 100% of resolution, and the second section outputs 90% of resolution, and the third section outputs 100% of resolution, respectively.

When the user command readjusts the level of the filter 0.5 times, the first section outputs 100% of resolution, and the second section outputs 95% of resolution, and the third section outputs 100% of resolution, respectively. When the user command readjusts the level of filter 2 times, the first section outputs 100% of resolution, and the second section outputs 80% of resolution, and the third section outputs 100% of resolution, respectively.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An apparatus for displaying 3D moving pictures, comprising:
   a data source providing unit which provides a data source containing a 3D moving picture, a variable filtering information of the 3D moving picture which is in time-sync with the 3D moving picture and controls fatigue that a user feels while watching the 3D moving pictures, and a filter mask image which is compressed on non-loss basis;
   a data decoder which decodes data of the data source;
   a video decoder which decodes the 3D moving picture of the data source;
   a filter mask image decoder which decompresses compression of the filter mask image;
   an audio decoder which decodes audio of the data source;
   a variable filter which is set by the variable filtering information and the filter mask image decoded by the filter mask image decoder, and adjusts output resolution of the 3D moving pictures according to time sections specified in the variable filtering information;
   a 3D moving picture output unit which outputs the 3D moving pictures filtered by the variable filter;
   an audio output unit which outputs the audio from the audio decoder; and a user interface which receives commands on use or non-use of the variable filter and provides a command to the variable filter.

2. The apparatus of claim 1, wherein the use command of the variable filter is directed to readjusting a level of the filtering.

3. The apparatus of claim 1, wherein said data source is provided via a ground wave broadcast or a satellite broadcast.

4. An apparatus for displaying moving pictures, comprising:
   a data source providing unit which provides a data source containing a moving picture, a variable filtering information of the moving picture which is in time-sync with the moving picture and controls fatigue that a user feels while watching the moving pictures, and a filter mask image which is compressed on non-loss basis;
   a data decoder which decodes data of the data source;
   a video decoder which decodes the moving picture of the data source;
   a filter mask image decoder which decompresses compression of the filter mask image;
   an audio decoder which decodes audio of the data source;
   a variable filter which is set by the variable filtering information and the filter mask image decoded by the filter mask image decoder, and adjusts output resolution of the moving pictures according to time sections specified in the variable filtering information;
   a moving picture output unit which outputs the moving pictures filtered by the variable filter;
   an audio output unit which outputs the audio from the audio decoder;
   a user interface which receives commands on use or non-use of the variable filter and provides a command to the variable filter; and
   a remote controller which operates in sync with the apparatus and comprises a switch for turning on or off the variable filter, and a variable switch for adjusting resolution of a region-based screen or a whole screen in a variable method or a step by step method.

5. The apparatus of claim 1, wherein said data source is provided via a storing medium recorded in a dictionary.

6. A method for displaying 3D moving pictures, comprising:
- a step for receiving a data source containing a 3D moving picture, a variable filtering information of the 3D moving picture which is in time-sync with the 3D moving picture and controls fatigue that a user feels while watching 3D moving pictures, and a filter mask image;
- a step for variable filtering the 3D moving pictures in which the filtering is set depending on the variable filtering information and the filter mask image decoded by the filter mask image decoder and output resolution of the 3D moving pictures is adjusted according to time sections specified in the variable filtering information; and
- a step for outputting the filtered 3D moving pictures.

7. The apparatus of claim 1, further comprising:
- a display that displays the 3D moving pictures with reduced resolution as output by the 3D moving picture output unit when the variable filter is in use.

8. The method of claim 6, further comprising:
- a step of displaying the 3D moving pictures with reduced resolution.

\* \* \* \* \*